United States Patent
De Kimpe et al.

(10) Patent No.: US 6,697,309 B2
(45) Date of Patent: Feb. 24, 2004

(54) METHOD AND DEVICE FOR RECORDING INFORMATION

(75) Inventors: Wim Felix Maria De Kimpe, Leuven (BE); Gerard Elise Noel Schreurs, Hasselt (BE); Marc Sevenants, Hasselt (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 33 days.

(21) Appl. No.: 10/024,756

(22) Filed: Dec. 19, 2001

(65) Prior Publication Data

US 2002/0089907 A1 Jul. 11, 2002

(30) Foreign Application Priority Data

Dec. 27, 2000 (EP) .............................. 00204827

(51) Int. Cl.[7] ................................. G11B 5/09
(52) U.S. Cl. ................... 369/47.3; 369/53.24
(58) Field of Search .................. 369/30.01, 30.03, 369/30.05, 32.01, 33.01, 47.13, 47.28, 47.3, 47.31, 53.24, 53.34

(56) References Cited

U.S. PATENT DOCUMENTS 6,198,707 B1 * 3/2001 Yamamoto ............... 369/47.11

FOREIGN PATENT DOCUMENTS

| EP | 0974966 A1 | 1/2000 |
|----|------------|--------|
| EP | 1102258 A2 | 5/2001 |
| JP | 10049990 A | 2/1998 |

* cited by examiner

*Primary Examiner*—Paul W. Huber
(74) *Attorney, Agent, or Firm*—Michael E. Belk

(57) ABSTRACT

A method and device for recording information signals on a partly recorded writable record carrier (11), e.g. an optical disc. An information signal represents at least one information unit. The record carrier has a recording track which comprises preformed track position information indicative of locations for recording the information units. From the information signal a modulated signal is generated, and the recording track is scanned for recording the modulated signal. If recording is after and adjacent an existing recorded signal, a method for seamless linking of 2 parts of a recording on a CD-R/CD-RW disk is described. Recording the modulated signal is started at a location dependent on the location of an end part of said earlier recorded information signal, while locking said recording clock speed to the track wobble. Interruption of a recording can be done without loss of data or loss of storage capacity. No difference between uninterrupted and interrupted recording is guaranteed for the play-back system.

7 Claims, 3 Drawing Sheets

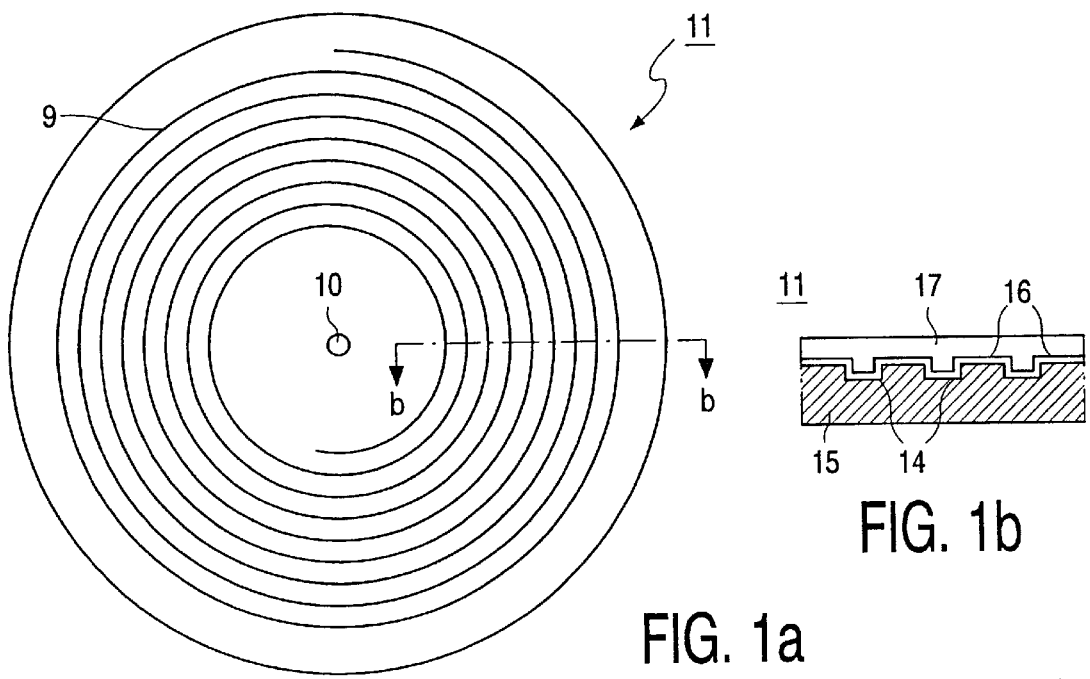
FIG. 1a
FIG. 1b
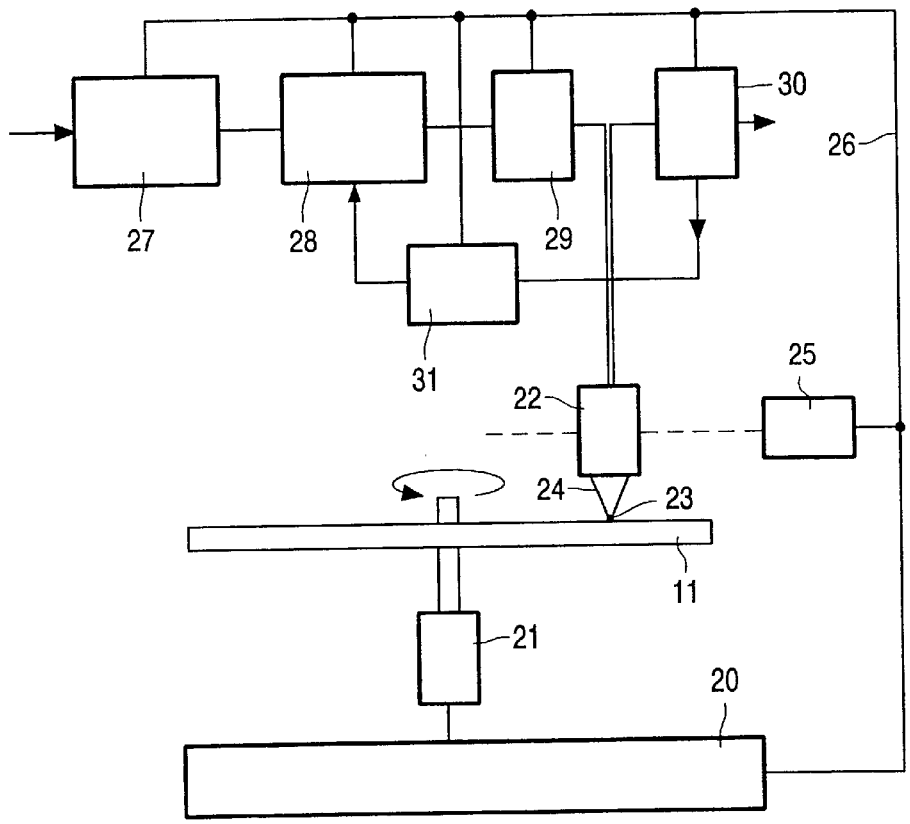
FIG. 2

METHOD AND DEVICE FOR RECORDING INFORMATION

The invention relates to a method of recording at least one information signal on a record carrier having a recording track which comprises a preformed track wobble and position information indicative of predefined locations for recording information and a first one of said locations comprising an earlier recorded information signal, said method comprising generating a modulated signal representing the at least one information signal, and scanning the recording track and recording the modulated signal after and adjacent to the first recorded information signal at a recording clock speed.

The invention further relates to a device for recording at least one information signal on a record carrier having a recording track which comprises preformed track wobble and position information indicative of predefined locations for recording information signals and a first one of said locations comprising an earlier recorded information signal, said device comprising modulator means for generating a modulated signal representing the at least one information signal, and recording means for scanning the recording track and recording the modulated signal after and adjacent to the first recorded information signal at a recording clock speed.

A method and apparatus for successively recording information units on a record carrier is known from U.S. Pat. No. 5,187,699 (PHQ88002). The information from the unit is modulated to a modulated signal and recorded in the track at predefined locations indicated by prerecorded track position information. The process of consecutively recording signals in adjacent areas in a track on the record carrier is called linking. In the known linking method, after a first modulated signal is completely recorded, the recording process is continued up to a link position after the last data byte of the information unit. When a next information signal is to be recorded, the recording process is started at the link position by recording dummy information up to the start of a following predefined location. As a result so called linking blocks are created between the first recorded signal and the second recorded signal, which linking blocks include said link position. Device for scanning optical record carrier. Known systems for recordable discs are the compact disc recordable or rewritable (CD-R(W)). To obtain a correct position for a recording on a CD-R(W) disk, 2 parameters need controlling: the start and stop position of the recording on the disk, and the speed of the bit stream relative to the linear velocity of the empty track on the disk. Between sessions, the positional accuracy is controlled in a quite coarse way, based on the position ATIP information encoded in the pre-groove. Linking zones with dummy data exist between recordings to make sure that a play-back system has enough time to re-lock PLL's and sync interpolation flywheels before reaching the actual user data. The data stream to the recorder should not be interrupted. If we want to cope with an interrupted data stream to the recorder, we should be able to stop the recording, and link the remainder of the recording without any loss of data, and also without any addition of dummy data between the 2 parts, since the latter would not be Orange book compliant. The biggest problem that today's disk writers suffer from is so-called 'buffer under-run'. When recording on a CD-R disk, the consequence for the user might be that he has to throw away the disk and start all over.

It is an object of the invention to provide seamless linking between recordings.

For this purpose, the method as described in the opening paragraph is characterized in that the method comprises reading the earlier recorded information signal and starting recording the modulated signal at a location dependent on the location of an end part of said earlier recorded information signal, while locking said recording clock speed to the track wobble. The device as described in the opening paragraph is characterized in that the device comprises retrieving means for reading the earlier recorded information signal and starting recording the modulated signal at a location dependent on the location of an end part of said earlier recorded information signal, and frequency locking means for locking said recording clock speed to the track wobble.

The invention is based on the following recognition. To be allowed to do interruption of a recording, the stop and re-start position should not differ by more then 2 channel bits. This to have good play-back without any loss of data for the user. This can be done by defining the stop position not based on ATIP, but based on the data itself, and accurate to 1 channel bit exactly. The start position is then controlled by reading back the previously written data, of which we know the end position, and determining the start position based on timing information retrieved from the decoder's digital bit recovery PLL, flywheeled frame syncs and sub-code information. This guarantees the spatial accuracy of start position relative to the stop position. To guarantee continuity of the bit frequency, both parts of the recording are done with a clock locked onto the pre-groove wobble carrier. Both parts have then a bit rate derived from the same reference.

These and other aspects of the invention will be apparent from and elucidated further with reference to the embodiments described by way of example in the following description and with reference to the accompanying drawings, in which FIG. 1a shows a record carrier (top view), FIG. 1a shows a record carrier (cross section), FIG. 2 shows a recording device, FIG. 3 shows a block diagram of the currently used system FIG. 4 shows the block diagram of the seamless linking.

Corresponding elements in different Figures have identical reference numerals.

Figure 3:
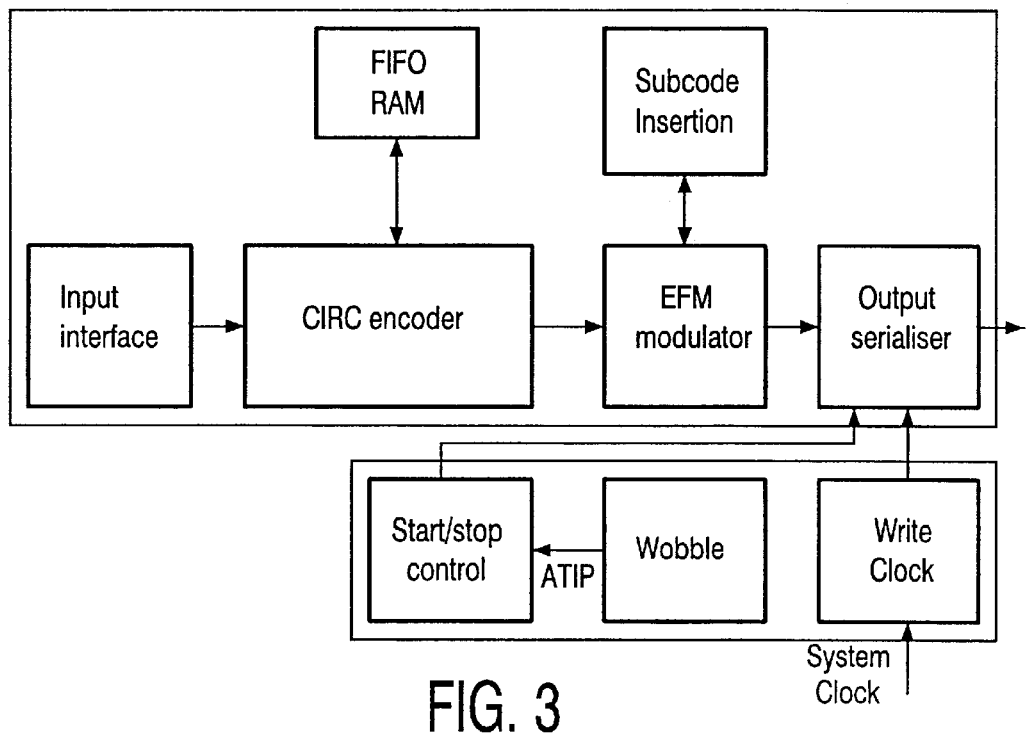

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW. The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called blocks. The position information may include specific synchronizing marks for locating the start of such units.

FIG. 1b is a cross-section taken along the line b—b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying information represented by modulated signals comprising frames. A frame is a predefined amount of data preceded by a synchronizing signal. Usually such frames also comprise error correction codes, e.g. parity words. An example of such a recording system is known from the DVD system, in which the frames carry 172 data words and 10 parity words. In the CD system error correction is effected by adding parity words and interleaving, the so called CIRC (Cross Interleaved Reed-Solomon Code) as described in GB 2076569. The first layer of error correction (called C1) corrects small local errors like random errors, and the second layer (called C2) corrects the large error such as burst errors. Further in the CD system the frames include subcode data, which subcode for example includes playing time indications and track/pause indicators.

FIG. 2 shows a recording device for writing information on a record carrier 11 of a type which is writable or re-writable, for example CD-R or CD-RW. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. The control unit 20 controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below with reference to FIGS. 3 to 7. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User information is presented on the input unit 27, which may comprise of compression means for input signals such as analog audio and/or video, or digital uncompressed audio/video. Suitable compression means are described for audio in WO 98/16014-A1 (PHN 16452), and for video in the MPEG2 standard. The input unit 27 processes the audio and/or video to unit of information, which are passed to the formatter 28 for adding control data and formatting the data according to the recording format, e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. The linking information is coupled to a linking unit 31, which linking unit is coupled to the formatter 28 for controlling the generation of the modulated signal. According to the invention the control unit 20 of the recording device and the linking unit 31 as shown in FIG. 2 are arranged for logically arranging the information to be recorded according to the methods described below with reference to the FIGS. 3 to 7. Thereto the control unit 20 is arranged for reading linking information via the read processing unit 30 from the record carrier and controlling the linking unit 31 for generating the modulated signal according to the logically arranged information.

FIG. 3 shows a block diagram of the currently used system. It consists of the encode datapath and the control. The control part has 2 main functions: generating a write clock and doing start/stop control. In the current system, a write clock is derived from a fixed crystal reference clock. The frequency can be fine-tuned by an additional phase error, coming from the Xerror calculation, this is the distance between subcode sync written to the disk and the ATIP sync encoded in the modulated wobble signal on the disk. This system allows to comply to the Orange book specification. The start and stop position is controlled completely on the timing information coming from the wobble signal. This is a quite coarse start stop mechanism, with a precision of ⅙ of an EFM frame length. This is around 98 channel bits. The encode datapath is flushed and initialized before every record start. In fact, not the entire datapath is initialized. It is only initialized down to the EFM modulator. This results in the first few bytes written to disk being faulty.

The further document describes what to do in the channel encoder to do seamless linking recording on an engine level. This feature would be used to prevent the known problem of buffer under run. For this it is needed to stop the recording when buffer under run is imminent, and then link the rest of the recording on a bit-accurate basis after the previously written part, so that the sync interpolation on a play-back system doesn't notice that the recording was interrupted.

For a reading system not to be disturbed, following requirements need to be met:

no (or very small) frequency jump between previous and next recording no (or very small) mis-synchronisation between EFM syncs of previous and next recording; basically it comes down to a maximum shift of the new sync of +/−3 channel bits limited phase jump between previous and next recording bit stream. In the basic system we will assure the first and second point. In the next generation embodiments we will discuss improvements to make the phase jump between previous and next recording smaller. The seamless linking basically comes down to doing start, resp. stop of a recording based on previously written (and read-back), resp. currently written subcode and bit offset within the subcode frame, opposed to doing start and stop based on ATIP, with run in and runout blocks added in front and at the back of a recording. This starting based on previous recording should guarantee the second requirement. The first requirement is guaranteed by writing real lock-to-disk, by generating a write clock which is frequency-locked to the wobble. This system includes embodiments of the demodulator, Q-code read-back, start/stop mechanism, wobble PLL.

Figure 4:
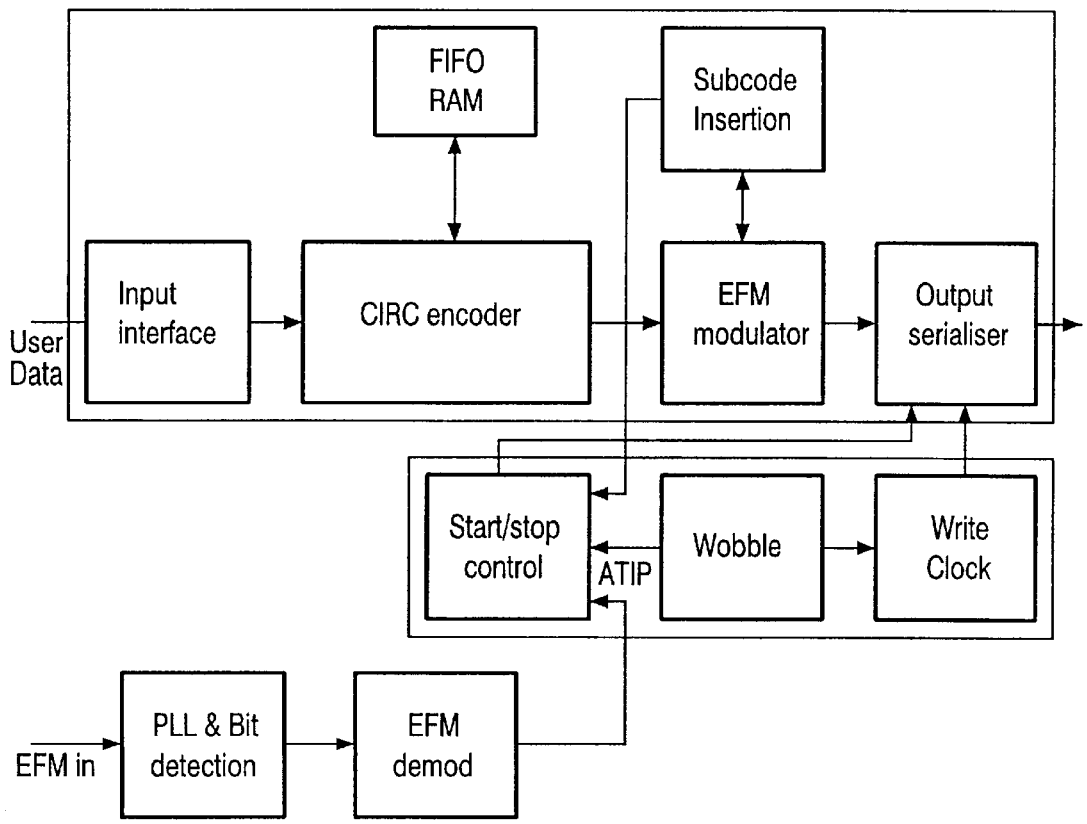

FIG. 4 shows the block diagram of the seamless link. The start of the session is done based on ATIP. At the moment a data stream interruption is imminent, the start/stop mechanism is switched from lock-to-wobble to lock-to-data. The new system differs from the current mechanism on following points:

The write clock is generated fully locked to disk, this means with the wobble carrier recovered by the digital wobble PLL as a reference. This is already possible in the current system, but improvements will be done for write clock generation jitter. Now there is a conflicting bandwidth requirement for the wobble PLL.

The start and stop for the main recording will still be done on ATIP, but for hold and resume actions on the recording when buffer under run is imminent, we will need to do more accurate stopping and re-starting. The stop position will be done bit-accurately on the written data: subcode frame, EFM frame and bit within a frame. The start and stop positions will be fully programmable. The starting position will need to be determined on the data already written on the disk, also in the form of subcode frame-EFM frame and bit within a frame. This can be done by means of the play back front end part (PLL, bit detection and EFM demodulator). The start position will be re-enforced by means of interpolation mechanism to flywheel position of EFM and subcode syncs and the content of the sub-code. Sync interpolation is already present in the current play-back system. Interpolation on subcode frame address will need to be added. The accuracy of the start position is the factor determining the quality of the seamless link mechanism. The accuracy depends on the timing precision of the play-back detection system (PLL). Basically this comes down to the accuracy of the clock source on which the bit detection circuit is running. On the start position accuracy, there are different embodiments, going from easy to implement and coarse to more difficult implementation with virtually infinite linking accuracy. The several embodiments allow for a step by step approach. This will be explained better in the next section.

The encode datapath needs to have a hold state, in which the whole datapath pipeline is just frozen, this while the write clock is still running. The hold state is indicated by the start/stop mechanism. The different embodiments on the start position control will be discussed in the following section. In all the embodiments, the stop mechanism can be taken the same.

The embodiments for start position control are described hereafter, starting with a simple start position on fixed system clock. In this system, the front end digital PLL will be used as is. This PLL is operating on a fixed system clock. If the system clock frequency is chosen so that it is around the channel bit rate, we can determine the start position down to the bit within an EFM frame. The start position is fully programmable. This makes it possible to compensate and fine tune in software for delays through up- and downstream data path, from optical signal on the disk for read back to optical signal on the disk for writing. Since the resume command actually is controlling the output data shifter on the write clock, it has to be re-clocked first from the system clock to write clock. The resume command is also given to the external world, in the form of Laser-on signal.

Figure 5:
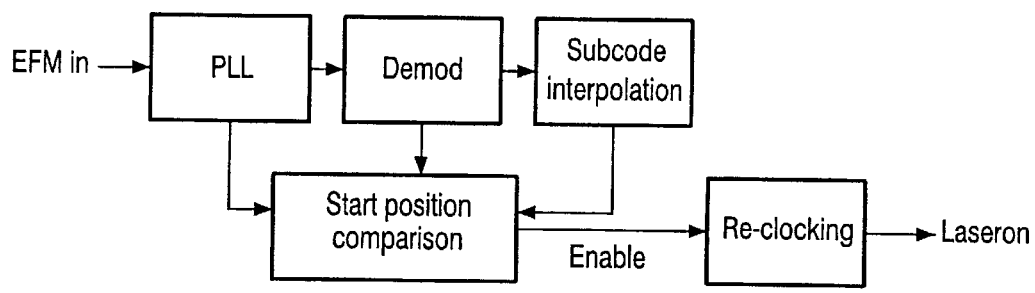
FIG. 5 shows the simple linking mechanism.

FIG. 5 shows the simple linking mechanism. Since there is no fixed phase relationship between the system clock and the write clock, we have 2 uncertainties determining the granularity of the start position: the phase of the incoming bit stream with respect to the system clock and the phase of the system clock with respect to the write clock. If we take for the system period, something around the bit clock period, the start position can be controlled with an accuracy of less then 2 channel bit clock periods. The phase error between previous and next recording bit stream can be 180 worst case. This system could be used as a first step. All changes done for this are also necessary for the other embodiments, which only do improvements to make the phase error smaller. Changes to be made with respect to the current system are:

extracting some control signals from current front end PLL and demodulator adding interpolation protection on the subcode address modifying start control with new input, and more accuracy.

The following embodiment is to have the start position fine tuned by write clock re-sync. On the start command given on the system clock, the phase error between this command and the actual bit stream can be extracted from the phase of the DTO inside the digital PLL. This phase error can be used to delay the start position with a number of sub-parts of the write clock. This can be done, because write clock is generated by dividing down the output of a VCO which is oscillating on a frequency much higher than write clock. By feeding forward the phase error between system clock and play-back bit clock, measured on the sys-tem clock in the digital PLL, a countdown circuit can be pre-set with the complement of this phase error, and so compensating for that phase error in a number of discrete steps. In fact, what the count-down circuit is doing, is decreasing the possible phase error from the system described in previous section, by matching the phase of the write clock to the phase of the bit clock on the disk. This is done by re-synchronising that write clock just before the recording. By adding an offset to the phase fed forward to the count-down circuit, we can compensate for delays in the system more accurately. The accuracy eventually is the period of the overclocking VCO. The higher its frequency, the more accurate the start position is.

Figure 6:
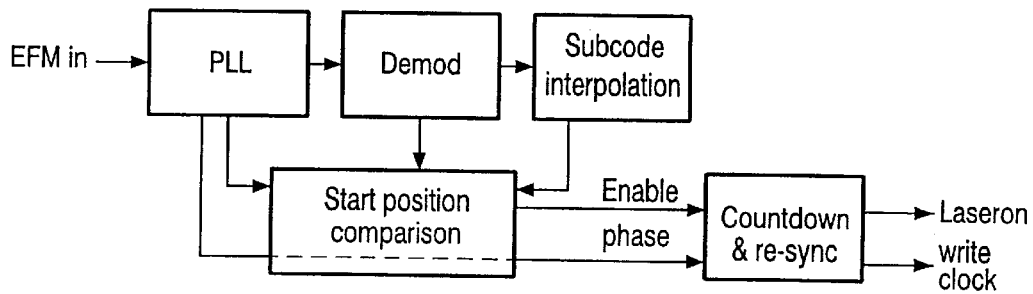
FIG. 6 shows a block diagram of write clock re-sync mechanism

FIG. 6 shows a block diagram of write clock re-sync mechanism. For this embodiment, the write clock generation has to be modified. The write clock dividers have to be moved very close to the analog block. They will also be removed from scan-test, since no clock tree insertion is allowed, to guarantee operation up to very high speeds. Very good layout has to be done of this circuit as well (probably has to be done manually). The changes have medium difficulty. The downside is that the accuracy is still discrete, and depends on the speed of the VCO. For a 16× writing system, currently the oscillator would be chosen to run at a speed of 4 times the write clock. This means that the highest precision is still around ¼ of the write clock, which is +/−90 degrees phase shift.

Figure 7:
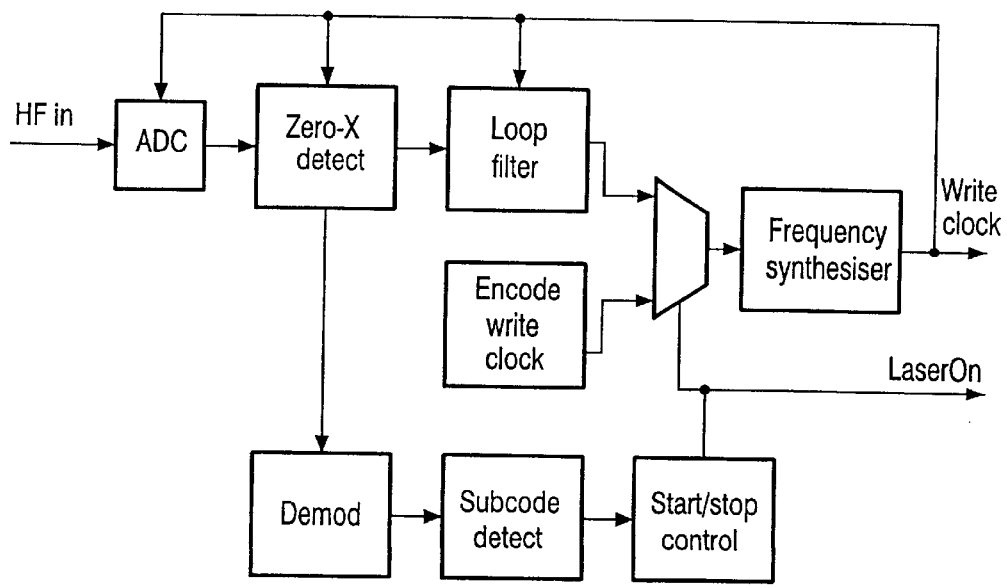
FIG. 7 shows block diagram for very accurate linking

FIG. 7 shows the block diagram for very accurate linking. The embodiment is a very accurate phase link by locking write clock on incoming bit stream. The main problem with previous embodiments is that the read PLL is time discrete, and on a different clock domain as the writing process. If however we could bring them on 1 clock domain, and lock the phase of the write clock to the phase of the play-back EFM stream, the phase accuracy just depends on jitter, which should be low anyway. This can be done by modifying the front end digital PLL to a mixed signal PLL. The DTO is then removed and replaced by the write clock frequency synthesizer. The ADC, zero crossing detector and digital loop filter, will be placed on a varying clock. The phase difference between write clock and incoming clock is tuned by regulating the zero crossings to a programmable phase in between two write clock rising edges. As a system, this is not too different from the current one, since the digital sample rate converter is in fact changed into an analog sample rate changer. When switching from read to write, also the write clock generation has to be switched from locked to EFM to locked to wobble.

Although the invention has been explained mainly by embodiments using the CD-R, similar embodiments are suitable for other optical recording systems like DVD-R or DVD+RW. Also for the information carrier an optical disc has been described, but other media, such as a magnetic disc or tape, may be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

What is claimed is:

1. Method of recording at least one information signal on a record carrier having a recording tract which includes a performed tract wobble and position information indicative of predefined locations for recording information and a first one of said locations comprising an earlier record information signal, said method comprising:
   (a) generating a modulated signal representing the at least one information signal;
   (b) scanning and the recording track and recording the modulated signal after and adjacent to the first recorded information signal at the recording clock speed; and
   (c) reading the earlier recorded information signal and starting recording the modulated signal data location dependent on the location of an end part of said earlier recorded information signal, while locking said recording clock speed to the track wobble, wherein said recording clock speed is determined by employing a write clock synthesized by regulating zero crossings of clock edges.

2. Method as claimed in claim 1, wherein an interruption of the information signals detected, and after detecting said interruption of the recording is stopped by using a reference signal, and were in the presence of the information signal after the interruption is detected, and after said presence detection and the recording is re-started using the same reference signal.

3. Method as claimed in claim 2, wherein the wobble constitutes the reference signal for both said stopping and restarting.

4. Method as claimed in claim 1, characterized in that the position of said information signals constituting and interrupted recording is accurate by starting recording based on the earlier written signal.

5. Device for recording at least one information signal on a record carrier having a recording track which comprises preformed track wobble and position information indicative of predefined locations for recording information signals and a first one of said locations comprising an earlier recorded information signal, said device comprising:
   modulator means for generating a modulated signal representing the at least one information signal;
   recording means for scanning the recording track and recording the modulated signal after and adjacent to the first recorded information signal at a recording clock speed; retrieving means for reading the earlier recorded information signal and starting recording the modulated signal at a location dependent on the location of an end part of said earlier recorded information signal; and
   frequency locking means (PLL) for locking said recording clock speed to the track wobble, wherein said recording clock speed is determined by employing a write clock synthesized by regulating zero crossings between clock edges.

6. Device as claimed in claim 5, wherein the recording means comprise detection means for detecting an interruption of the information signal, and for, after detecting said interruption, stopping the recording by using a reference signal, and for detecting the presence of the information signal after the interruption, and for, after said presence detection, re-starting the recording using the same reference signal.

7. Device as claimed in claim 6, wherein the detection means are for detecting the wobble as the reference signal for both said stopping and re-starting.

* * * * *